United States Patent
Griffith

(10) Patent No.: US 6,195,542 B1
(45) Date of Patent: Feb. 27, 2001

(54) IDENTIFICATION BY A CENTRAL COMPUTER OF A WIRELESS TELEPHONE FUNCTIONING AS A TRANSACTION DEVICE

(75) Inventor: Gary L. Griffith, Arvada, CO (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/127,395

(22) Filed: Jul. 31, 1998

(51) Int. Cl.⁷ ....................................................... H04Q 7/08
(52) U.S. Cl. ............................................. 455/406; 705/26
(58) Field of Search .................................. 455/403, 406, 455/407, 408; 705/18, 21, 26

(56) References Cited

U.S. PATENT DOCUMENTS

| | | | |
|---|---|---|---|
| 5,719,918 | * 2/1998 | Serbetciouglu | 379/58 |
| 5,893,094 | * 4/1999 | Horowitz | 707/5 |
| 5,903,830 | * 5/1999 | Joao | 455/406 |
| 5,983,093 | * 11/1999 | Haimi-Cohen | 455/411 |
| 5,983,094 | * 11/1999 | Altschul | 455/413 |

* cited by examiner

Primary Examiner—Thanh Cong Le
Assistant Examiner—Nick Corsaro
(74) Attorney, Agent, or Firm—John C. Moran

(57) ABSTRACT

Utilizing a wireless telephone to function as a transaction device in conjunction with central computer that establishes the validity of the wireless telephone to make transactions. In a first embodiment, a wireless telephone places a call to a central computer which provides a central verification of the wireless terminal's authorization to make transactions. The central computer requests from the wireless telephone personal information of the user that can be used to verify a transaction. Once the wireless telephone is verified, the wireless telephone transmits to the central computer account information. The central computer then contacts a site computer that is controlling a transaction unit with which the wireless telephone wishes to complete a transaction. The site computer then transmits to the transaction unit and the central computer a transaction number. The central computer relays this transaction number to the wireless terminal which displays it to the user. The site computer relays the transaction number to the transaction unit, and the transaction unit also displays the transaction number. The user of the wireless terminal then confirms the transaction when the correct transaction number is displayed. In a second embodiment, the transaction number is not visually displayed but rather is transmitted over a second transmission medium to the wireless telephone confirming that the correct transaction is taking place.

20 Claims, 18 Drawing Sheets

IDENTIFICATION BY A CENTRAL COMPUTER OF A WIRELESS TELEPHONE FUNCTIONING AS A TRANSACTION DEVICE

CROSS REFERENCE TO RELATED APPLICATIONS

G. L. Griffith, "A Wireless Telephone As A Transaction Device"; and

G. L. Griffith, "Interaction Of A Wireless Telephone With A Transaction Unit".

These applications are being filed concurrently with this application and are assigned to the same assignee.

TECHNICAL FIELD

This invention relates to secure transaction and more particularly, to an arrangement for utilizing a central computer to verify a wireless telephone to function as a transaction device.

BACKGROUND OF THE INVENTION

Within the prior art, various transaction devices have been utilized to allow individuals to perform transactions. These transactions may be to purchase merchandise or services or may be to gain access to a secure area. Among the commonly used transaction devices is a credit card with a magnetic strip that identifies the credit card account of the individual. The standard credit card has no capability of receiving information from the transaction unit utilized to read the credit card. In addition, the validity of the credit card can only be indirectly verified. However, various types of smart cards do have the ability to store transactional information and to later reproduce this transaction information. For example, it is possible to have a smart card that is utilized as a standard credit card but receives information from the transactional unit defining what was purchased. In addition, the smart card can organize this information for later transmission to a personal computer via a physical link.

Similarly, other types of transactions involve such things as entering secure areas. Because of the need to preserve proprietary information, or restrict access to dangerous physical locations, many building facilities have secure areas which can only be accessed by designated people. Access to these secure areas is controlled by identification of personal features of an individual, keyed or unkeyed locks, and identification badges such as cards with magnetic strips. The cards with magnetic strips are similar to credit cards or smart cards.

The problems that exists with the prior art transaction devices fall into four major categories. First, these transaction devices are not capable of directly and independently establishing their validity with an independent center. Second, these devices require that the transaction unit have a special interface for reading information from the device. The special reading facility may take the form of physical contact such as in a credit card application or may allow limited wireless reading of the transaction device by the transaction unit using, for example, electromagnetic transmission. However, even in the situation where the transaction device communicates information via electromagnetic transmission, the transaction unit must be specifically equipped for the particular type of electromagnetic transmission. The third problem is the proliferation of credit cards, checkbooks, debit cards, and security cards that the average individual must carry. Fourth, is the amount of time required to complete the transaction. For example, when a credit card is used to purchase groceries at a supermarket. First, the groceries must be rung up; and then, the credit card entered and verified before the transaction can be completed.

SUMMARY OF THE INVENTION

The foregoing problems are solved and a technical advance is achieved by the utilization of a wireless telephone to function as a transaction device in conjunction with central computer that establishes the validity of the wireless telephone to make transactions. In a first embodiment, a wireless telephone places a call to a central computer which provides a central verification of the wireless terminal's authorization to make transactions. The central computer requests from the wireless telephone personal information of the user that can be used to verify a transaction. The personal identification information may be a simple personal identification number (PIN) or advantageously voice identification. Once the wireless telephone is verified, the wireless telephone transmits to the central computer account information. The central computer then contacts a site computer that is controlling a transaction unit with which the wireless telephone wishes to complete a transaction. The site computer then transmits to the transaction unit, and the central computer a transaction number. The central computer relays this transaction number to the wireless terminal which displays it to the user. The site computer relays the transaction number to the transaction unit and the transaction unit also displays the transaction number. The user of the wireless terminal then confirms the transaction when the correct transaction number is displayed on the transaction unit by transmitting an acceptance message to the central computer which relays this message to the site computer. After the transaction is complete, the site computer transmits transaction data to the central computer. Advantageously, the central computer determines whether the transaction data is to be transmitted to the wireless telephone or communicated to a personal computer (PC) owned by the user of the wireless telephone. Advantageously, within a large facility such a supermarket, only the site computer needs to have a communication link over which calls can be received from the central computer. One skilled in the art could readily envision that there could be more that one central computer serving various accounts.

In a second embodiment, the transaction number is not visually displayed but rather is transmitted over a second transmission medium to the wireless telephone confirming that the correct transaction is taking place.

Advantageously, by utilizing the transaction number, the wireless telephone can transmit the account information to the site computer well in advance of the actual financial transaction taking place. For example, within a supermarket, the user could request that the wireless telephone transmit the account information while the user is standing in line for the cash register.

Advantageously, where the wireless telephone receives the transaction data, the wireless telephone can place a call to the personal computer of the user and transfer the transaction information to the personal computer. This alleviates the need of the user physically attaching the wireless telephone to the personal computer. It is assumed that the personal computer performs the necessary financial and database functions on transaction information as required by the user.

These and other features and advantages of the invention will become apparent from the following description of illustrative embodiments of the invention considered together with the drawing.

DETAILED DESCRIPTION

Figure 1:
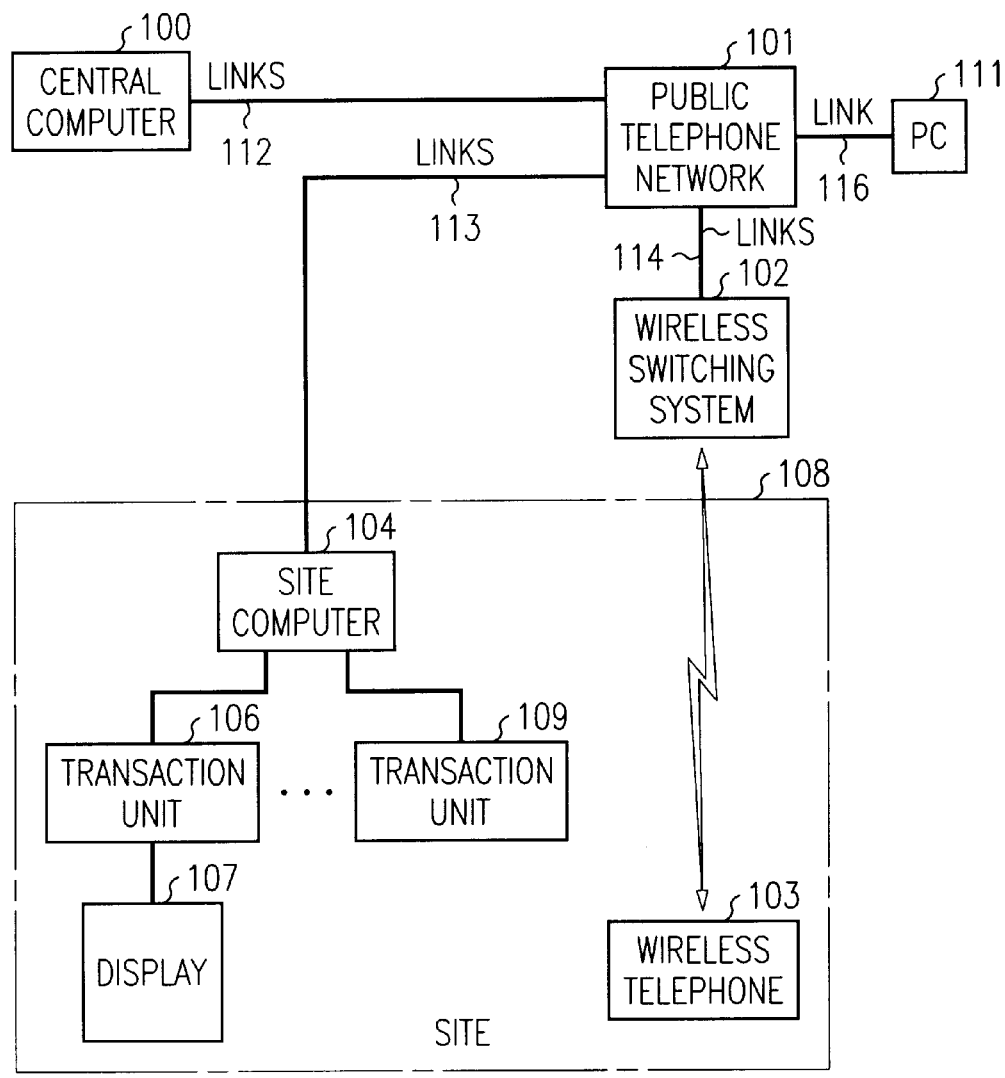
FIG. 1 is a block diagram of a system for performing the first embodiment.

FIG. 1 illustrates a system for implementing the first embodiment of the invention. In the first embodiment, site 108 has site computer 104 that controls transaction units 106–109. Attached to each transaction unit is a visual display such as display 107 which is connected to transaction unit 106. If site 108 is a supermarket, the transaction units are cash registers, and site computer 104 is the store computer that controls the cash registers. Wireless telephone 103 interconnects via a wireless telecommunication path to wireless switching system 102 that is connected via links 114 to public telephone network 101. Central computer 100 is connected via links 112 to public telephone network 101. Central computer 100 maintains a central database that is utilized to verify that wireless telephones, such as wireless telephone 103, are authorized to make transactions. The user of wireless telephone 103 has personal computer (PC) 111 at the residence of the user. PC 111 is connected via a modem and link 116 to public telephone network 101. In addition, site computer 104 is interconnected via modems and links 113 to public telephone network 101.

To understand the operation of the fist embodiment, consider the following example. Site 108 is a supermarket; and the user of wireless telephone 103 has selected merchandise and is waiting in line to pay for this merchandise at transaction unit (cash register) 106. The user initiates a call to central computer 100 via wireless switching system 102, links 114, public telephone network 101, and links 112. Advantageously, this call may be a data call. When central computer 100 receives the call from wireless telephone 103 specifying that a transaction is taking place at site 108 using transaction unit 106, central computer 100 verifies that the site is valid. Central computer 100 then receives the PIN from wireless telephone 103 and verifies that the PIN is valid. If the PIN is not valid, central computer 100 performs error recovery and drops the call with wireless telephone 103. If the PIN is valid, wireless telephone 103 then transmits the account information, and central computer 100 verifies this account information. After verifying the account information and the PIN, central computer 100 sets up a call to site computer 104 and transmits the transaction unit identification and account information to site computer 104. The previous steps can be performed while the user of wireless telephone 103 is standing in line since no interaction is required with transaction unit 106.

In response to the information from central computer 100, site computer 104 transmits a transaction number to both transaction unit 106 and central computer 100. The transaction number is used to verify the transaction. When wireless telephone 103 receives the transaction number, the wireless telephone displays the transaction number to the user. Transaction unit 106 also displays the transaction number on display 107 that is visible to the user. When the transaction is complete, if the displayed transaction number is identical to the transaction number received by wireless telephone 103, the user accepts the transaction. Wireless telephone 103 then transmits an acceptance message to central computer 100 which in turn relays this acceptance to site computer 104.

In response to the acceptance message, site computer 104 transmits to central computer 100 transaction data defining the transaction. Central computer 100 can either retransmit this data to wireless telephone 103 for internal storage within the wireless telephone or transmit this data to PC 111. Advantageously, the transaction data consists of an itemized list of items by price. Wireless telephone 103 is responsive to the received transaction data to either store it internally or to transfer it to PC 111. Advantageously, this transfer can occur at a later point at time. U.S. Pat. No. 5,559,313 discloses how such transaction data could be utilized and processed by PC 111.

Figure 2:
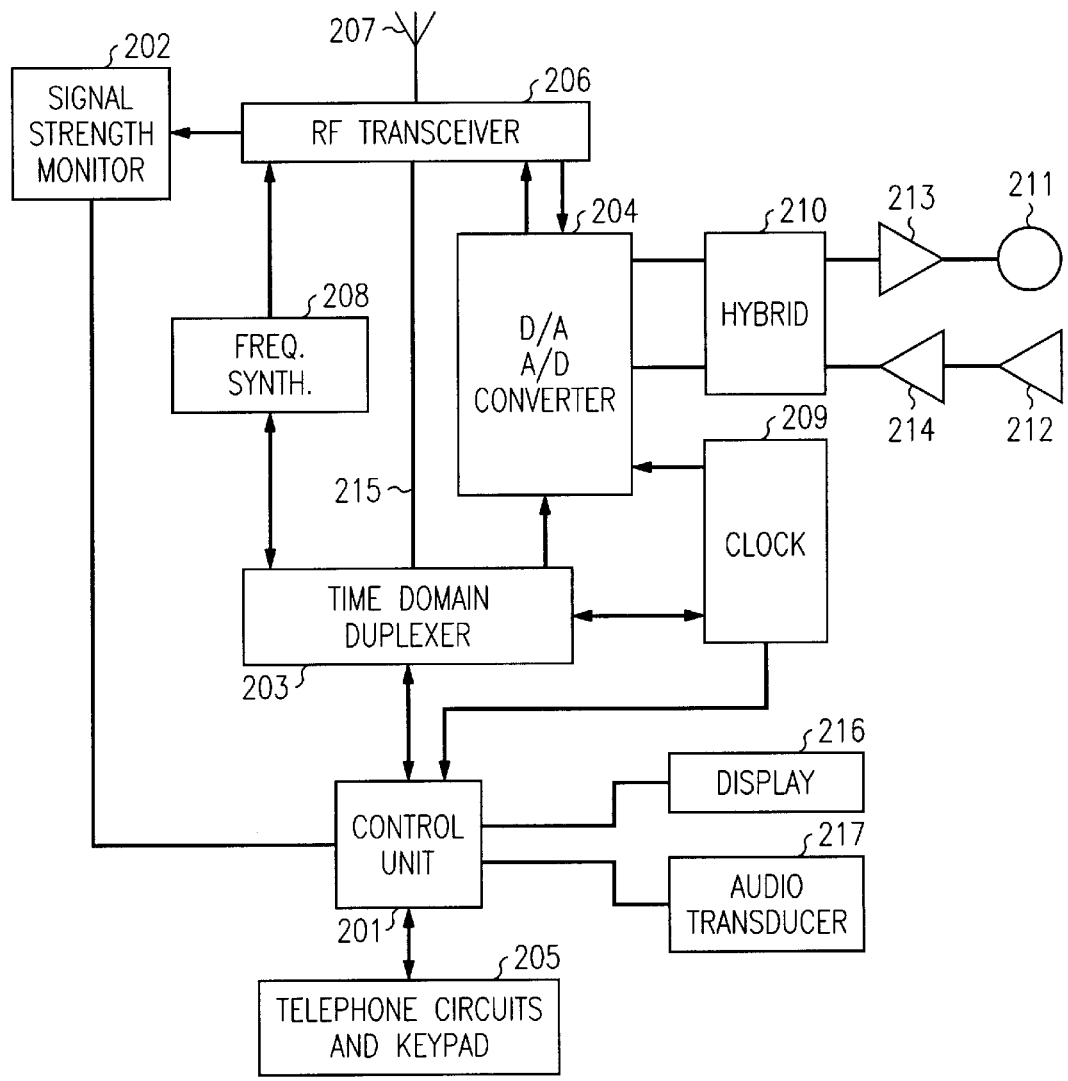
FIG. 2 is a block diagram of a wireless telephone for utilization in the first embodiment.

Wireless telephone 103 is advantageously illustrated in greater detail in FIG. 2. Wireless set 103 implements a wireless protocol that allows wireless telephone 103 to establish a wireless signal link with wireless switching system 102. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless telephone is provided by control unit 201. Units 202, 203, 206, 207, 208, and 209 provide the RF communication capabilities for the wireless telephone. Elements 204, 210, and 211–214 provide the audio information received and transmitted to the user; whereas, elements 216–218 and 205 provide the basic user interface. In response to receiving a transaction number via units 206, 208, and 203, control unit 201 displays the transaction number on display 216.

Figure 3:
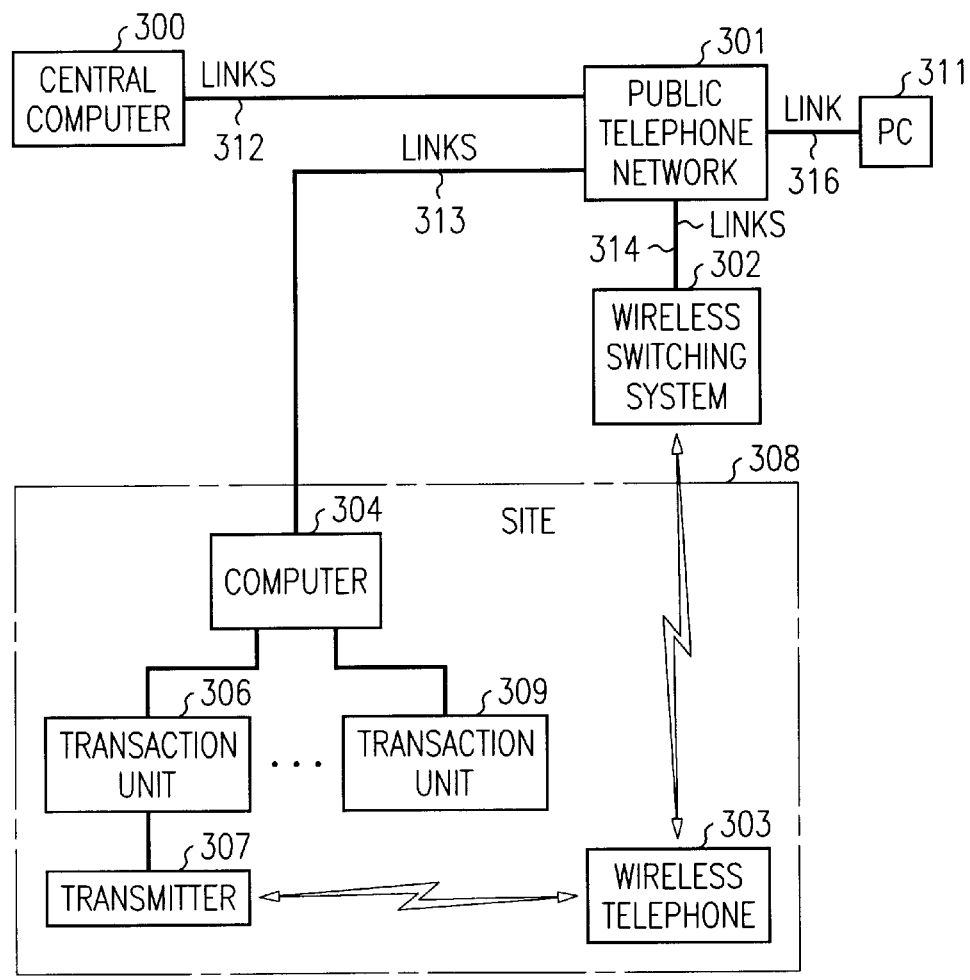
FIG. 3 illustrates in block diagram form, a system including the second embodiment.

FIG. 3 illustrates a system for performing the second embodiment of the invention. The operation of the second embodiment is similar to that of the first embodiment with the exception that the transaction number is transmitted to wireless telephone 303 by the transaction unit via a second transmission medium distinct from the transmission medium of wireless switching system 302. The transmission of the transaction number via the second medium frees the user from having to do visual comparison of the transaction number.

Figure 4:
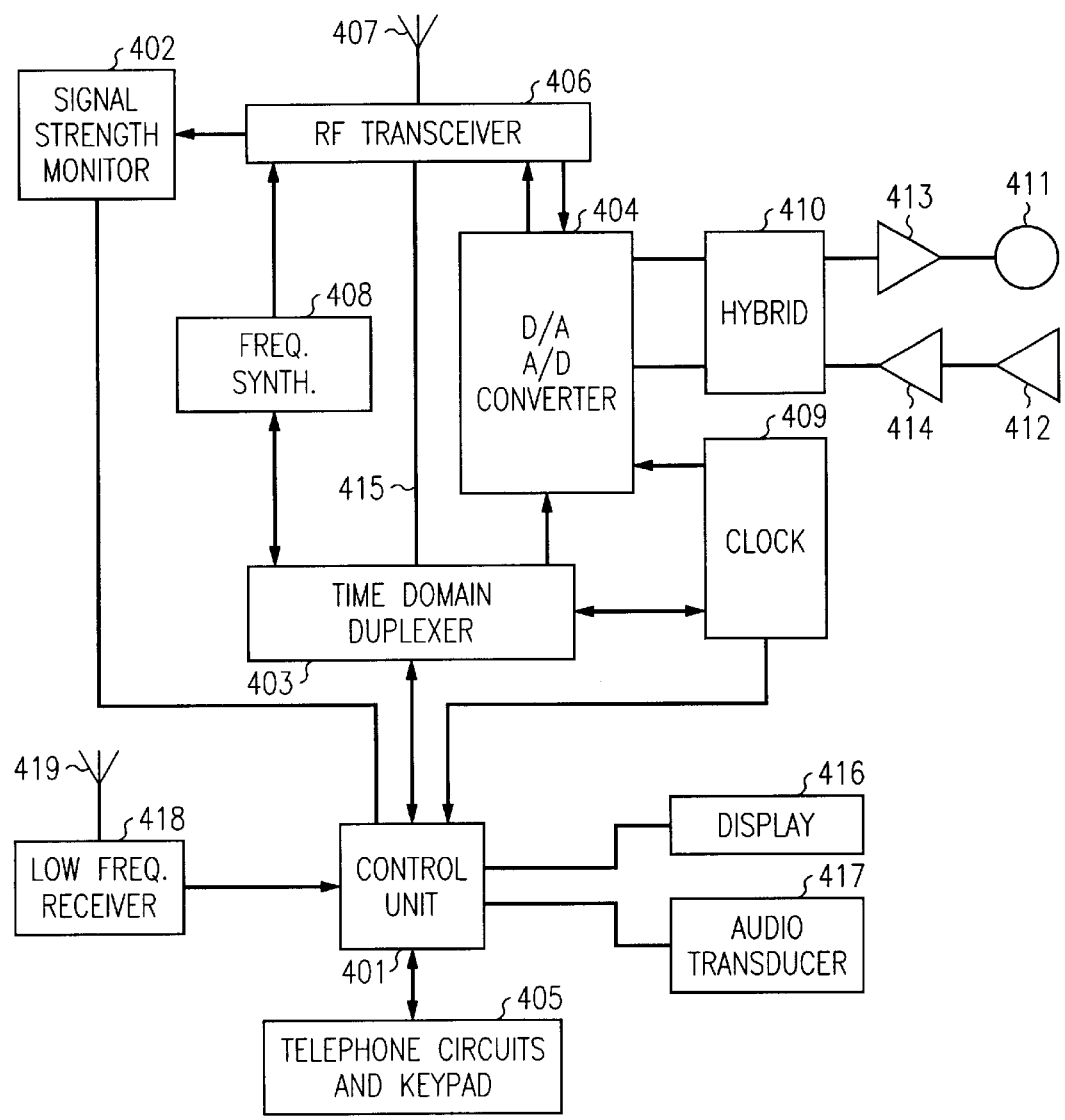
FIG. 4 illustrates, in block diagram form, a wireless telephone for utilization in the second embodiment.

Wireless telephone 303 is advantageously illustrated in greater detail in FIG. 4. Wireless set 303 implements a wireless protocol that allows wireless telephone 303 to establish a wireless signal link with wireless switching system 302. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless telephone is provided by control unit 401. Units 402, 403, 406, 407, 408, and 409 provide the RF communication capabilities for the wireless telephone. Elements 404, 410, and 411–414 provide the audio information received and transmitted to the user; whereas, elements 416–418 and 405 provide the basic user interface.

Figure 5:
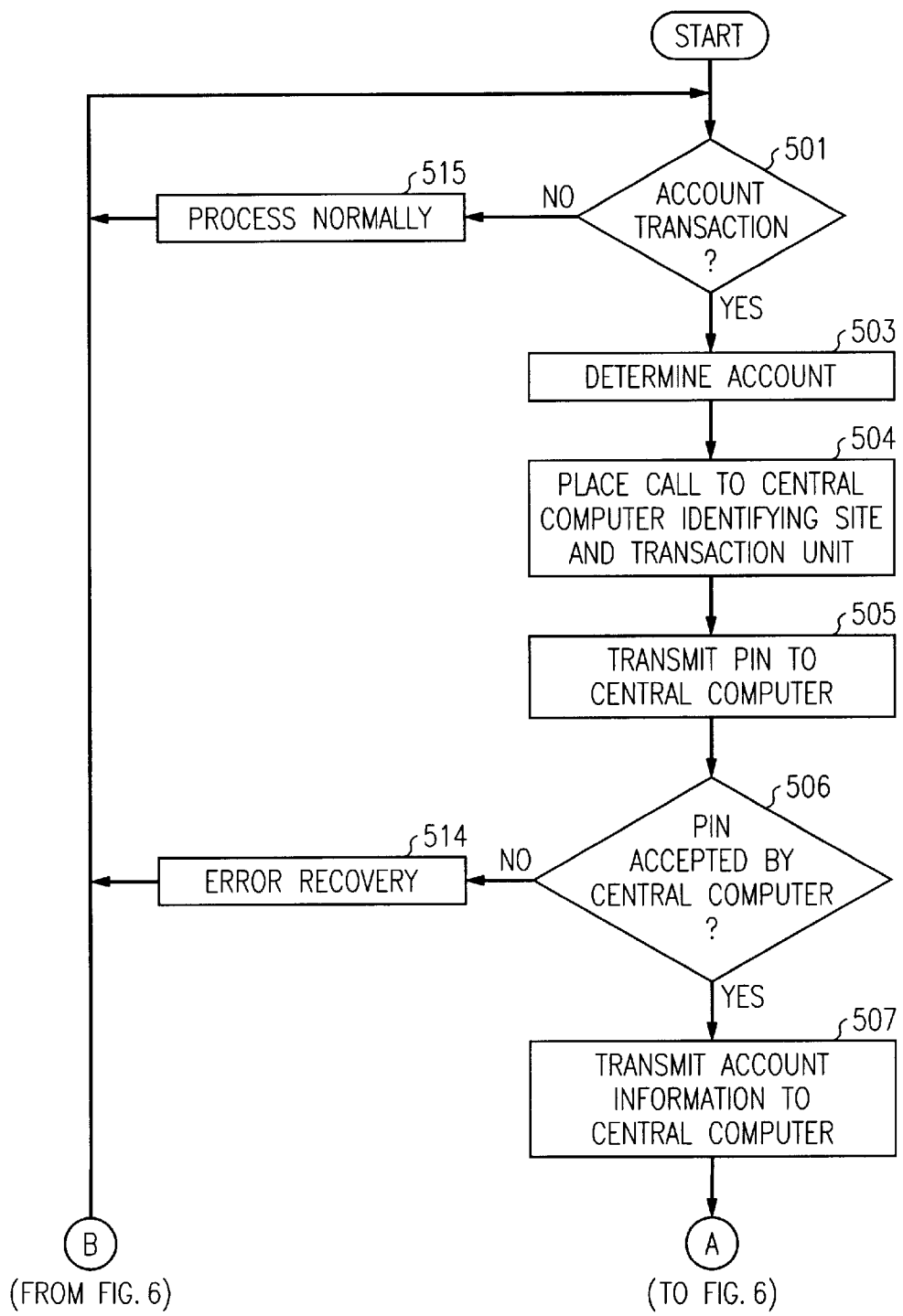
FIGS. 5 and 6, illustrate in flowchart form, steps performed by a wireless telephone in implementing the first embodiment of the invention.
Figure 6:
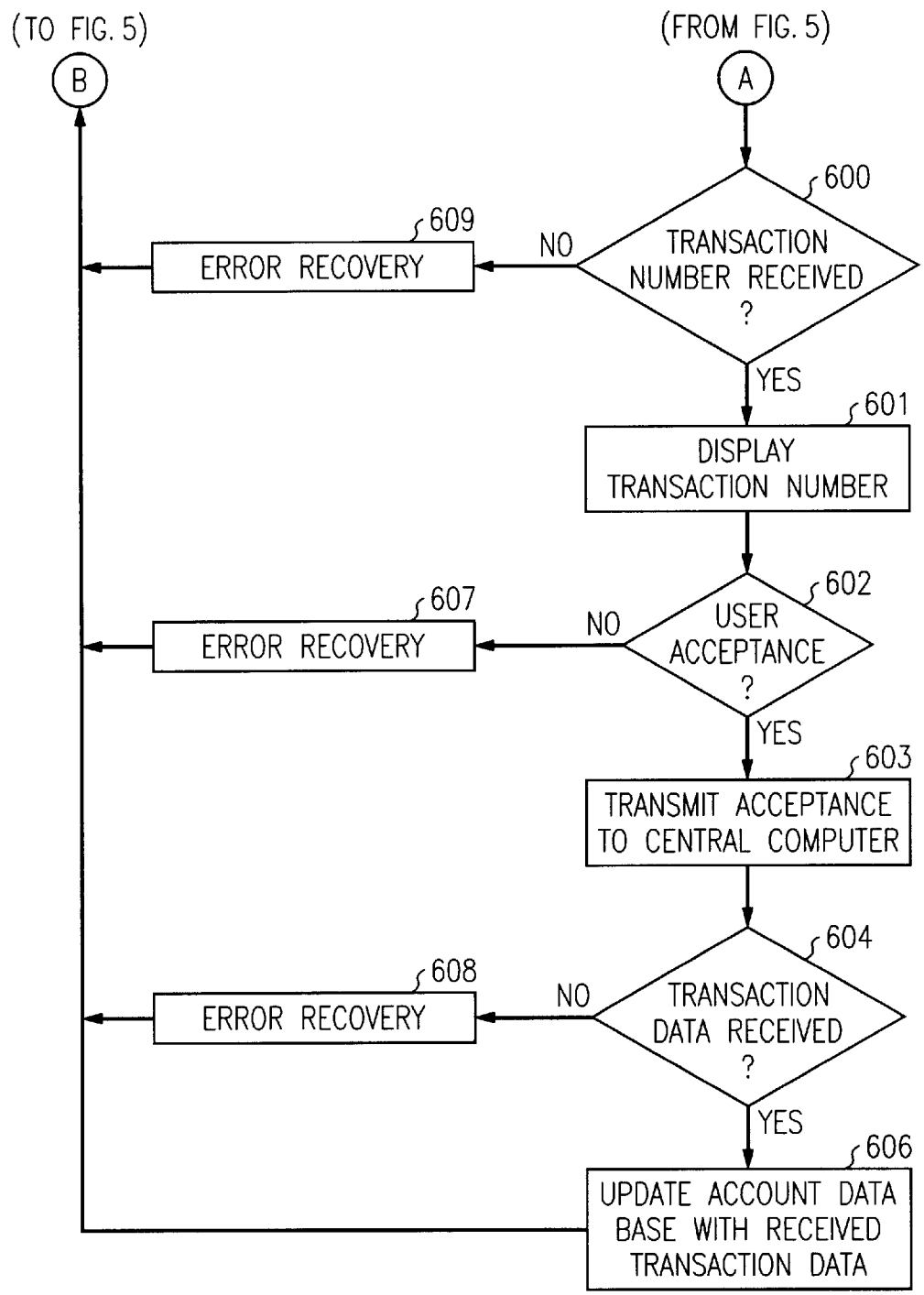

FIGS. 5–11 illustrate, in flow chart form, steps performed in implementing the first embodiment of the invention. In particular, FIGS. 5 and 6 illustrate steps performed by wireless telephone 103 of FIGS. 1 and 2. After the operations are started, decision block 501 determines if the user is requesting an account transaction. If the answer is no, block 515 performs normal processing before returning control back to decision block 501.

If the answer is decision block 501 is yes, then 503 determines the account against which the transaction will be charged. Block 504 places a call to central computer 100 identifying the site and transaction unit. Block 505 then transmits the PIN to central computer 100. Decision block 506 determines if the central computer accepted the PIN. If the answer is no, block 514 performs error recovery before transferring control back to decision block 501. If the answer is yes in decision block 506, block 507 transmits the account information to central computer 100 before transferring control to decision block 600 of FIG. 6.

Decision block 600 waits for a predefined amount of time for the transaction number to be received from the site computer via central computer 100. If the transaction number is not received within the predefined amount of time, control is transferred to block 609 which performs error recovery before transferring control back to decision block 501 of FIG. 5. If the answer in decision block 600 is yes, block 601 displays the transaction number on the wireless telephone. Decision block 602 waits until the user accepts the transaction. If the user does not accept the transaction, block 607 performs error recovery before transferring control back to decision block 501 of FIG. 5. If the user accepts the transaction, block 603 transmits an acceptance message to central computer 100. Decision block 604 waits for the receipt of transaction data from central computer 100. If no transaction data is received, block 608 performs error recovery. However, if it has been predefined that central computer 100 will directly transmit the transaction data to PC 111, the error recovery is to do nothing. If the answer is yes in decision block 604, block 606 updates the account database with the received transaction data. The operation of block 606 may involve the later transmission of the received transaction data to PC 111. After execution of either blocks 606 or 608, control is transferred back to decision block 501 of FIG. 5.

Figure 7:
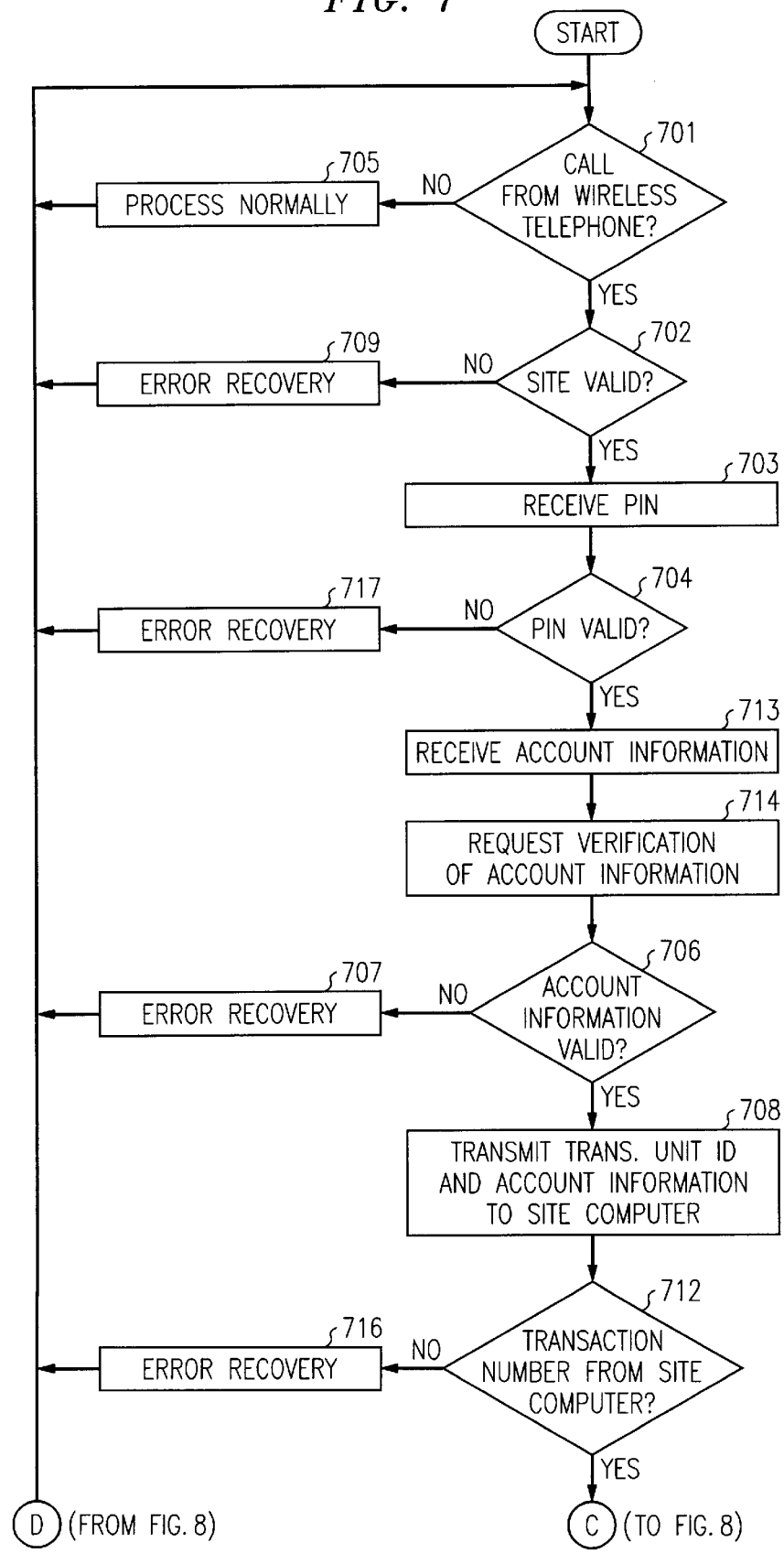
FIGS. 7 and 8 illustrate, in flowchart form, steps performed by a central computer in implementing the first embodiment of the invention.
Figure 8:
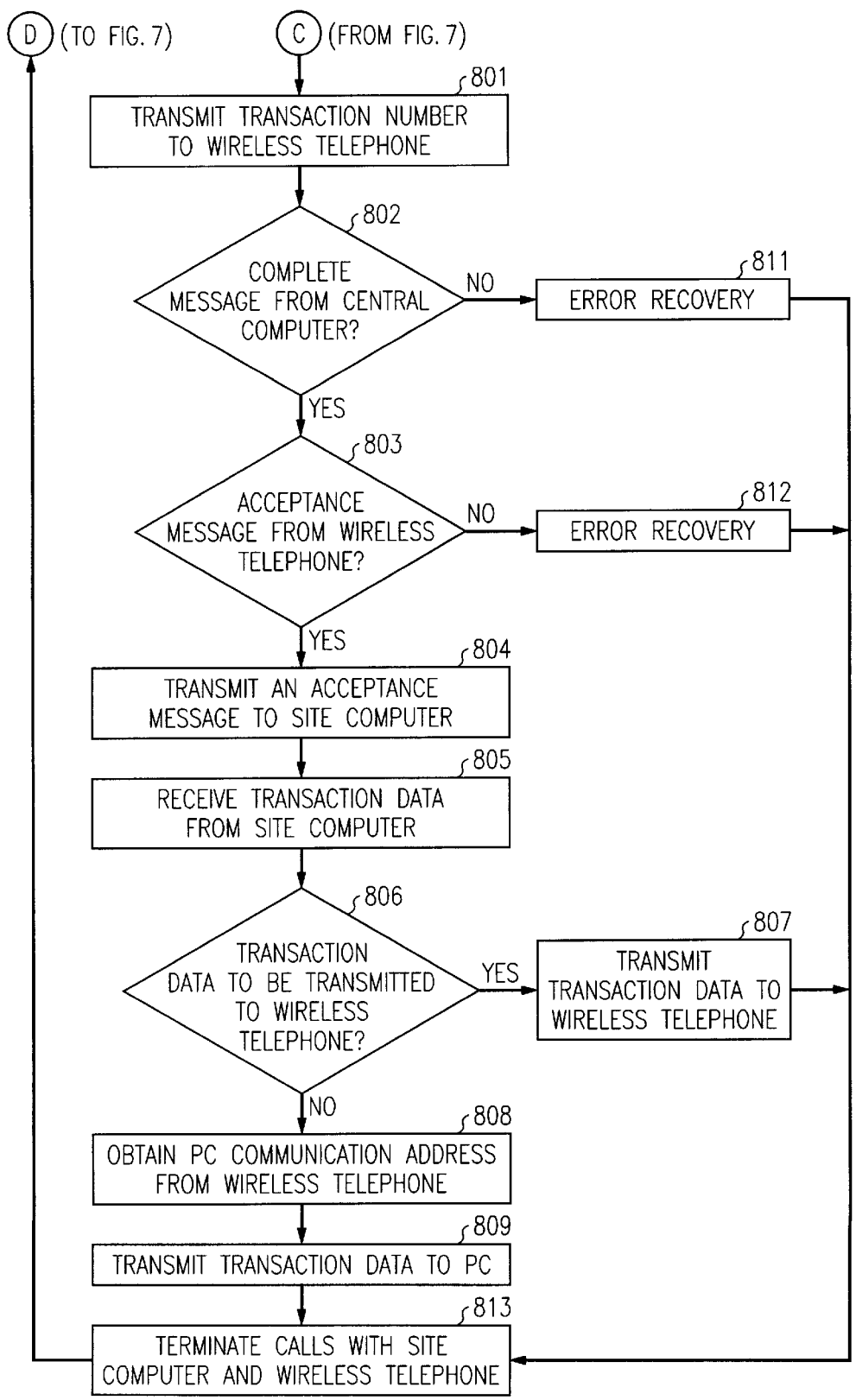

FIGS. 7 and 8 illustrate the steps performed by central computer 100 in implementing the first embodiment. Once operation is started, decision block 701 determines if a call is being received from a wireless telephone. If the answer is no, block 705 performs normal processing before returning control back to decision block 701. If the answer is yes in decision block 701, decision block 702 determines if the message from the wireless telephone specifies a valid site. If the answer is no, block 709 performs error recovery before transferring control back to decision block 701. If the answer in decision block 702 is yes, block 703 receives the PIN from the wireless telephone, and decision block 704 determines if the PIN is valid. If the answer in decision block 704 is no, block 717 performs error recovery before transferring control back to decision block 701. If the answer in decision block 704 is yes, block 713 receives the account information from the wireless telephone. Block 714 requests from the appropriate database verification of the account information. Decision block 706 determines if the account information is valid. If the answer is no, block 707 performs error recovery before transferring control back to decision block 701. If the answer in decision block 706 is yes, block 708 transmits the transaction unit identification and account information to site computer 104. Decision block 712 then awaits for a predefined amount of time for the transaction number from the site computer 104. If the transaction number is not received, control is transferred to block 716 which performs error recovery before transferring control back to decision block 701. If the answer in decision block 712 is yes, control is transferred to block 801 of FIG. 8.

Block 801 transmits the transaction number to the wireless telephone. Decision block 802 awaits for a complete message from central computer 100. If a complete message is not received, block 811 performs error recovery before transferring control back to decision block 701 of FIG. 7. If a complete message is received in decision block 802, decision block 803 determines if an acceptance message is received from the wireless telephone within a predefined amount of time. If the acceptance message is not received, control is transferred to block 812 which performs error recovery before transferring control to decision block 701 of FIG. 7. If the answer in decision block 803 is yes, block 804 transmits the acceptance message to site computer 104. Block 805 then receives the transaction data from site computer 104. Decision block 806 determines if the transaction data is to be transmitted to the wireless telephone. If the answer is yes, block 807 transmits the transaction data to the wireless telephone before transferring control to block 813. Block 813 terminates the calls with the site computer and the wireless telephone before transferring control back to decision block 701 of FIG. 7. If the answer in decision block 806 is no, block 808 obtains the PC communication address from the wireless telephone; and block 809 transmits the transaction data to the PC before transferring control to block 813.

Figure 9:
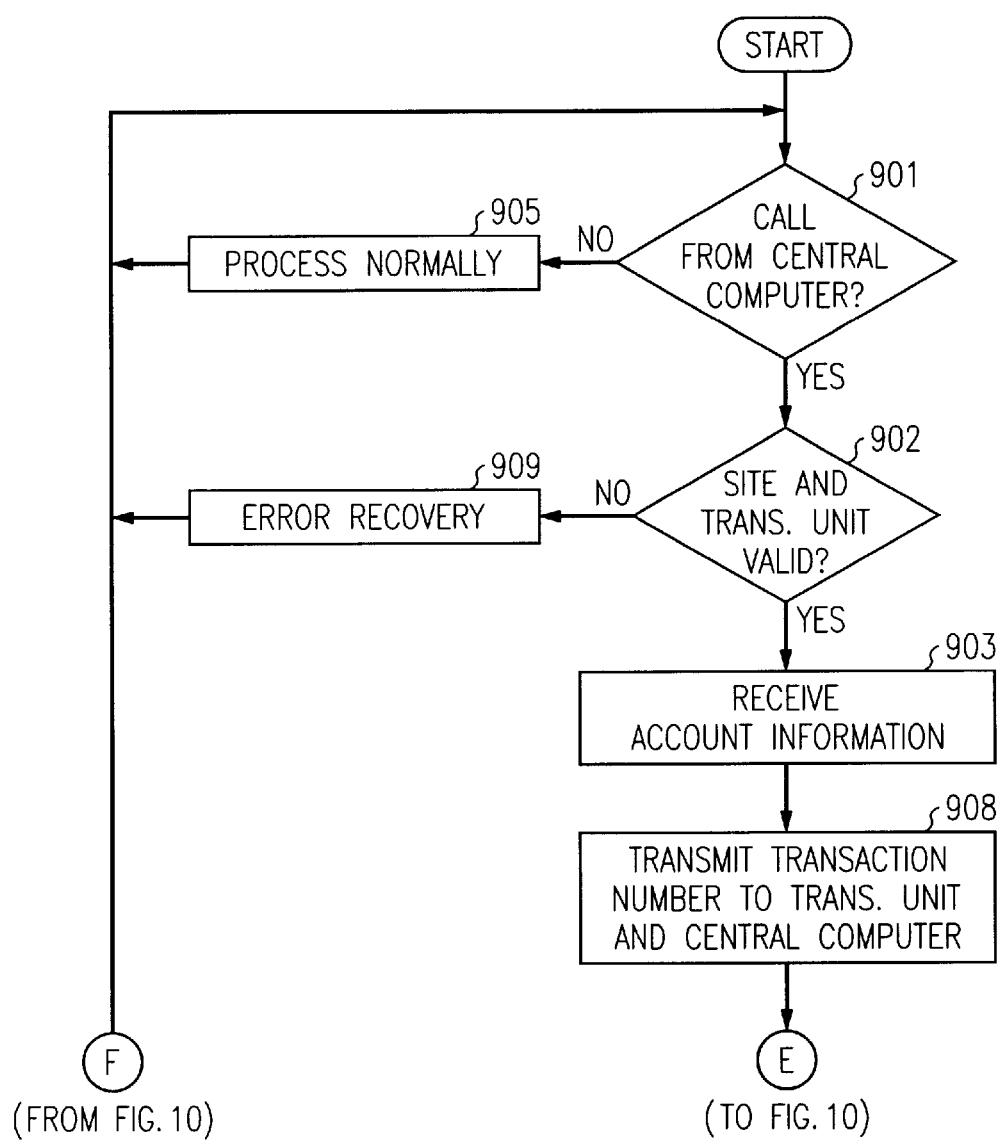
FIGS. 9 and 10 illustrate, in flowchart form, steps performed by a site computer in implementing the first embodiment of the invention.
Figure 10:
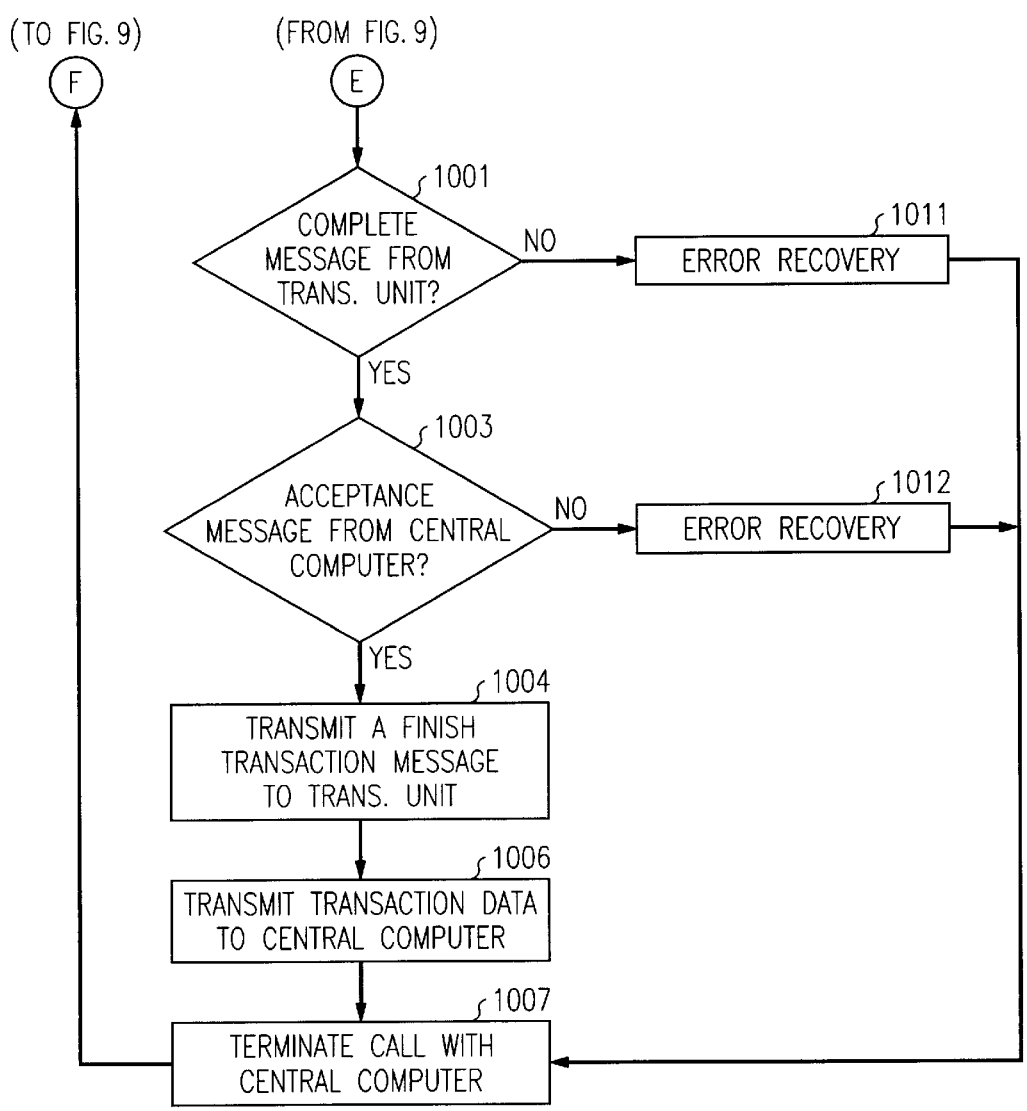

FIGS. 9 and 10 illustrate the steps performed by site computer 104. Once processing has been started, decision block 901 determines if a call is being received from central computer 100. If the answer is no, block 905 performs normal processing before returning control back to decision block 901. If the answer is yes, decision block 902 determines if the site and transaction unit identification information received from central computer 100 is valid. If the answer is no, block 909 performs error recovery before transferring control back to decision block 901. If the answer in decision block 902 is yes, block 903 receives the account information from central computer 100. Block 908 then determines and transmits a transaction number to the transaction unit and central computer 100 before transferring control to decision block 1001 of FIG. 10.

Decision block 1001 determines if a complete message has been received from the transaction unit within a predefined amount of time. If the answer is no, control is transferred to block 1011 which performs error recovery before transferring control to block 1007. Block 1007 terminates the call with central computer 100 before transferring control back to decision block 901 of FIG. 9. If the answer in decision block 1001 is yes, decision block 1003 determines if an acceptance message has been received from central computer 100. If the answer is no, block 1012 performs error recovery before transferring control to block 1007. If the answer in decision 1003 is yes, block 1004 transmits a finish transaction message to the transaction unit. Block 1006 transmits the transaction data to central computer 100 before transferring control to block 1007.

Figure 11:
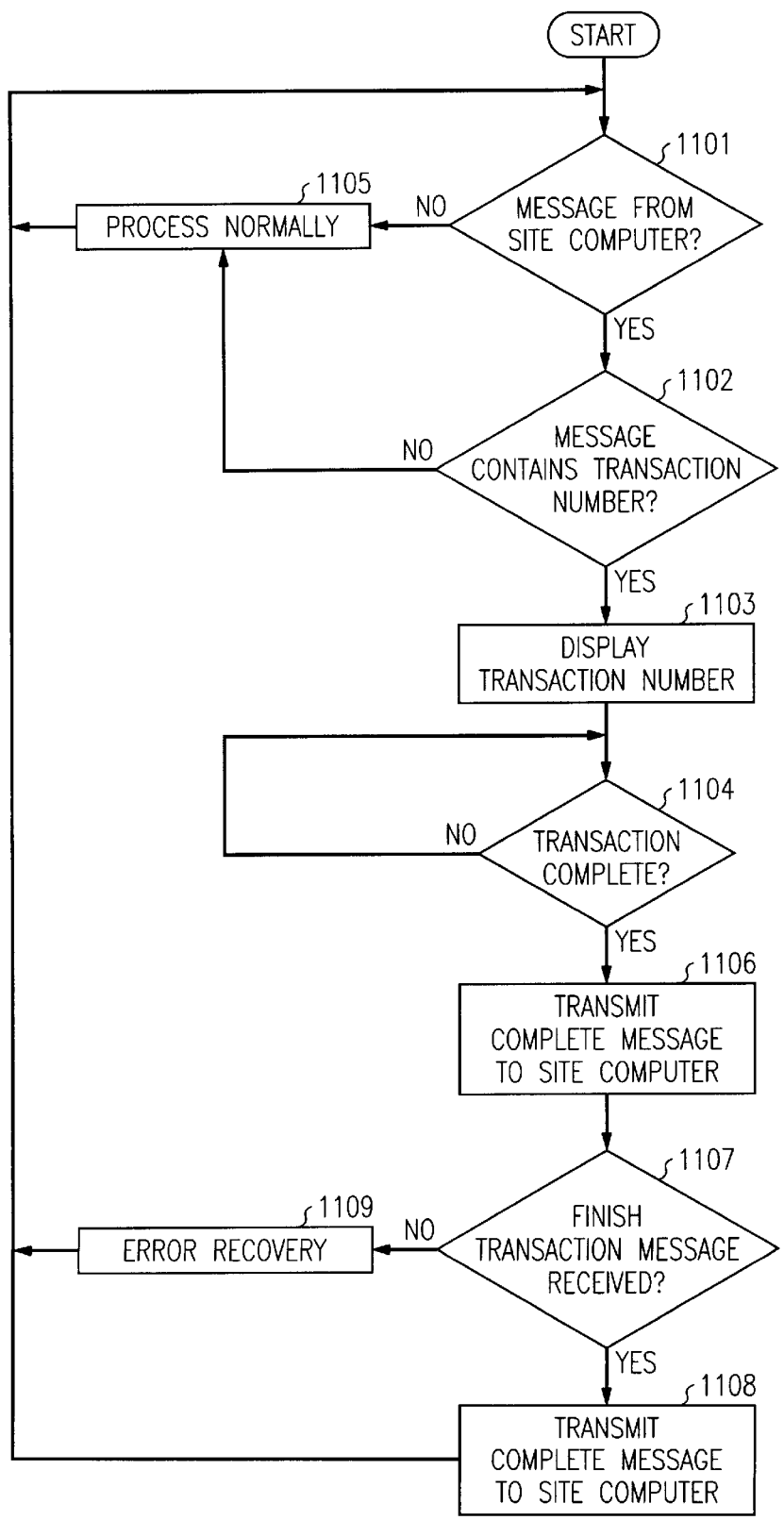
FIG. 11 illustrates, in flowchart form, steps performed by a transaction unit in implementing the first embodiment of the invention.

FIG. 11 illustrates the steps performed by a transaction unit in implementing the first embodiment. After execution is started, decision block 1101 determines if a message has been received from site computer 104. If the answer is no, control is transferred to block 1103 which performs normal processing before transferring control back to decision block 1101. If the answer in decision block 1101 is yes, decision block 1102 determines if the message contains a transaction number. Site computer 104 transmits the transaction number in all messages pertaining to the acceptance of a transaction by the wireless terminal. If the answer in decision block 1102 is no, control is transferred to block 1103. If the answer is yes, block 1103 displays the transaction number on the attached display. Decision block 1104 determines when the transaction is complete and transfers control to block 1106 which transmits a complete message to site computer 104. After execution of block 1106, decision block 1107 waits for a finish transaction message from site computer 104. If this message is not received, block 1109 performs error recovery before transferring control back to decision block 1101. If the finish transaction message is received, block 1108 transmits a complete message to site computer 1108.

Figure 12:
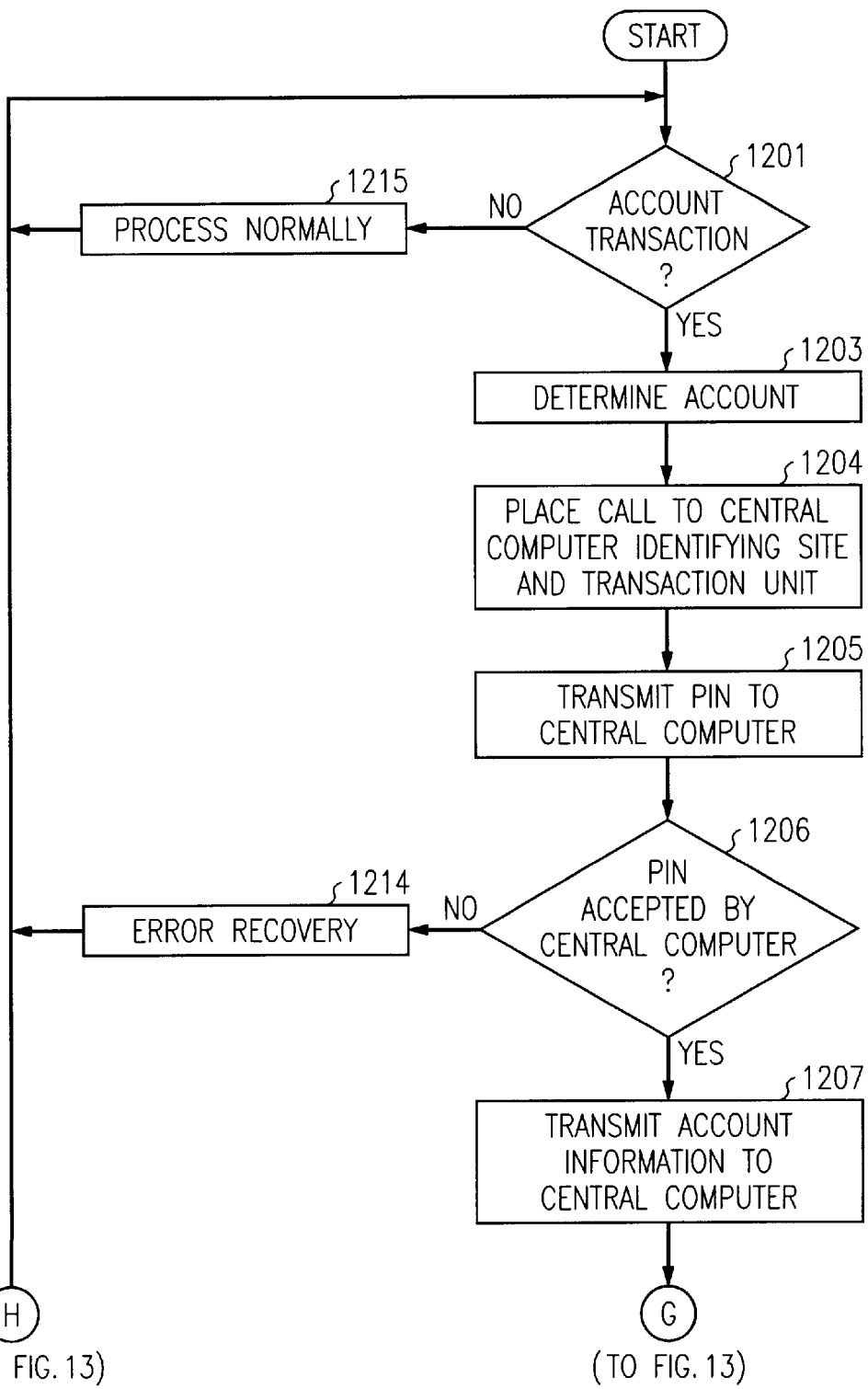
FIGS. 12 and 13 illustrate, in flowchart form, steps performed by a wireless telephone in implementing a second embodiment of the invention.
Figure 13:
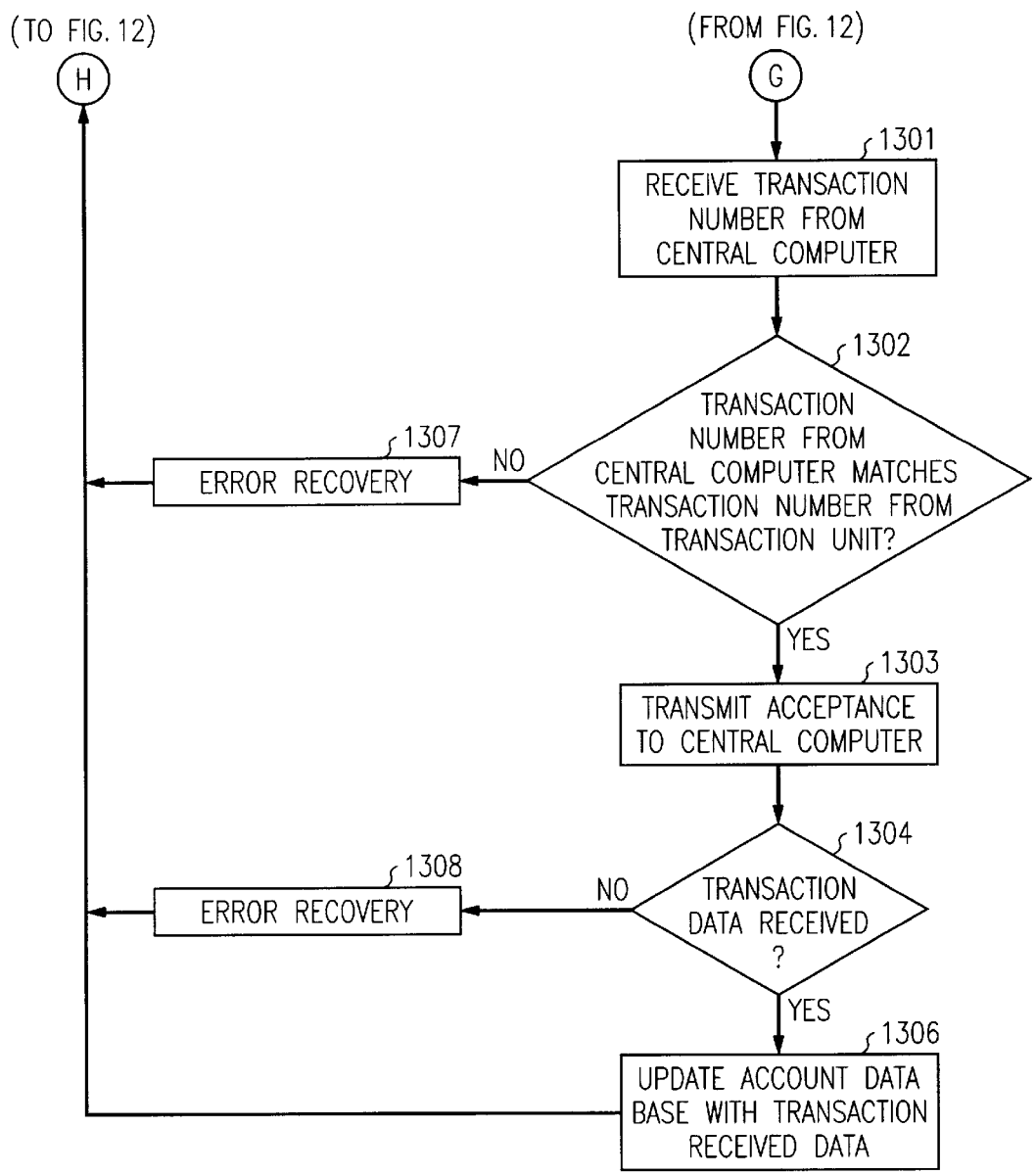
Figure 14:
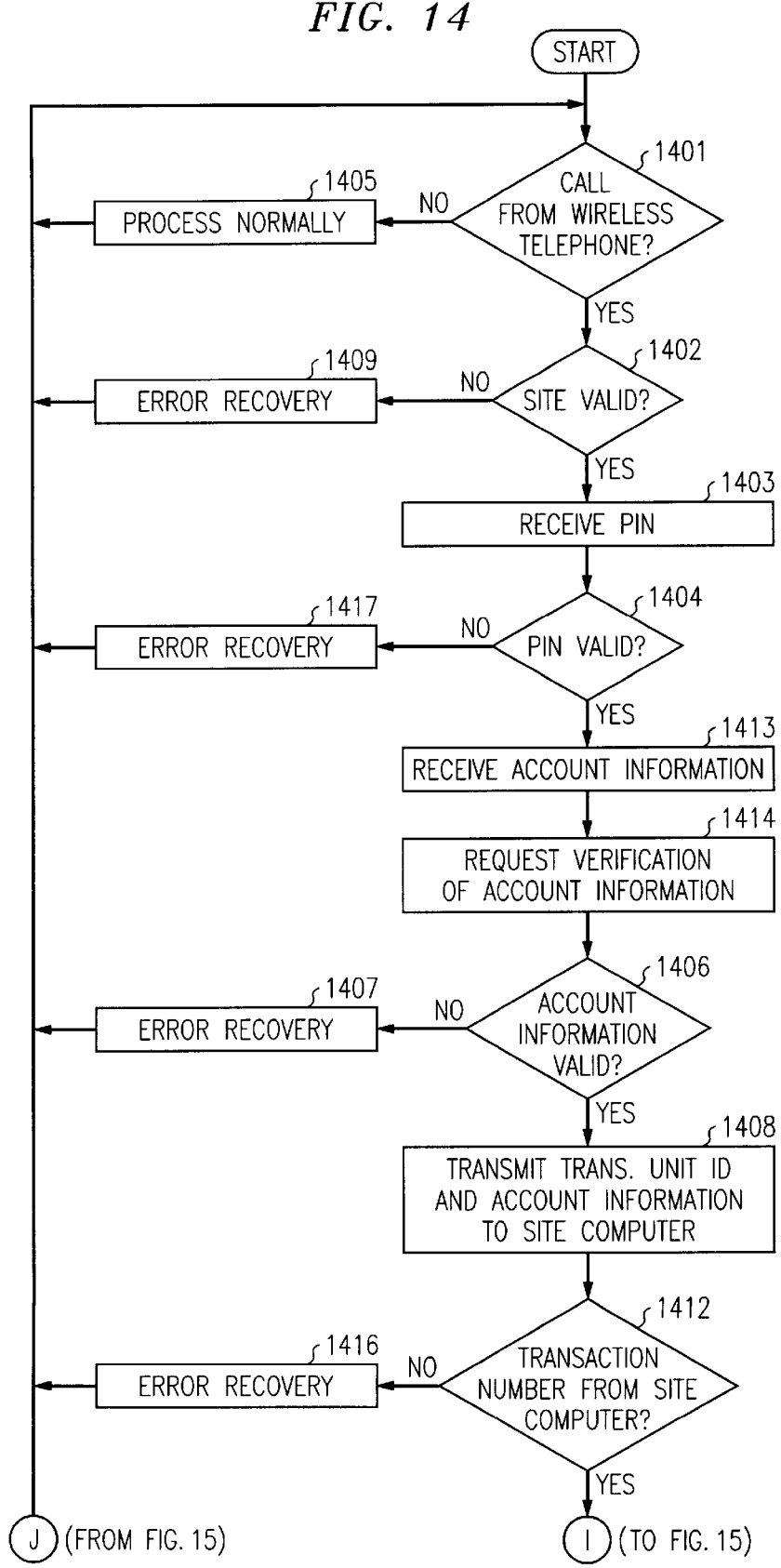
FIGS. 14 and 15 illustrate, in flowchart form, steps performed by a central computer in implementing the second embodiment of the invention.
Figure 15:
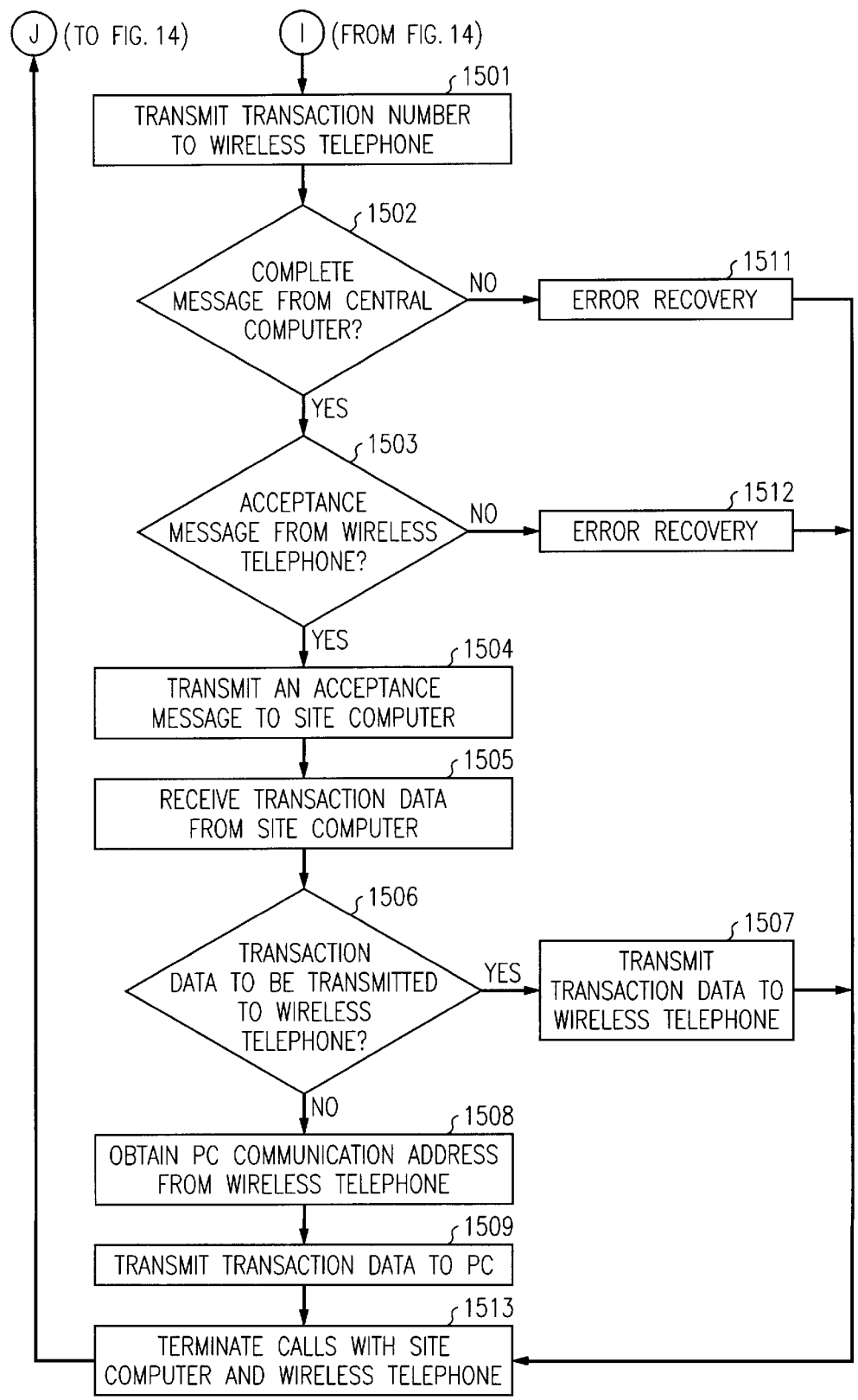
Figure 16:
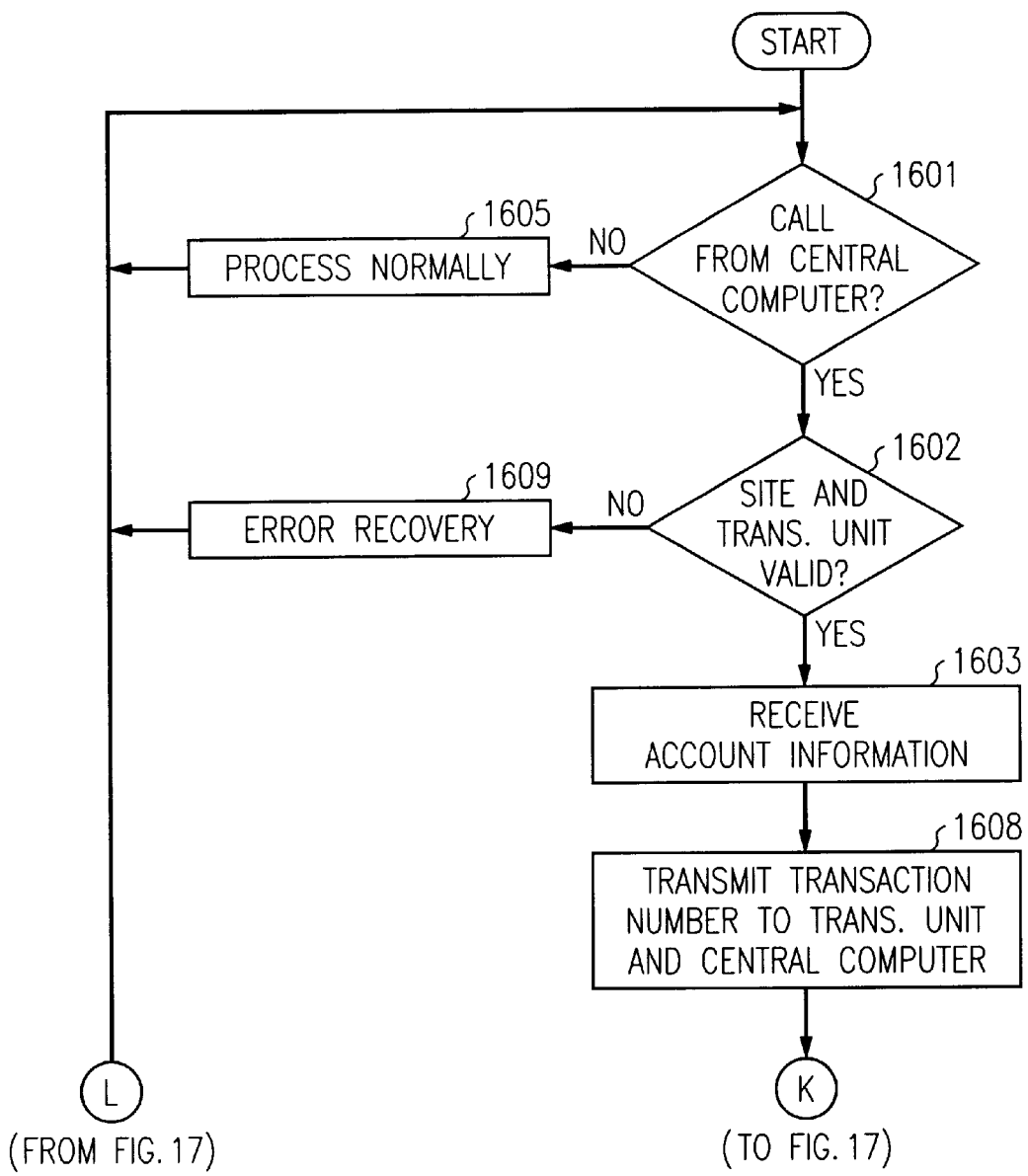
FIGS. 16 and 17 illustrate, in flowchart form, steps performed by a site computer in implementing the second embodiment of the invention.
Figure 17:
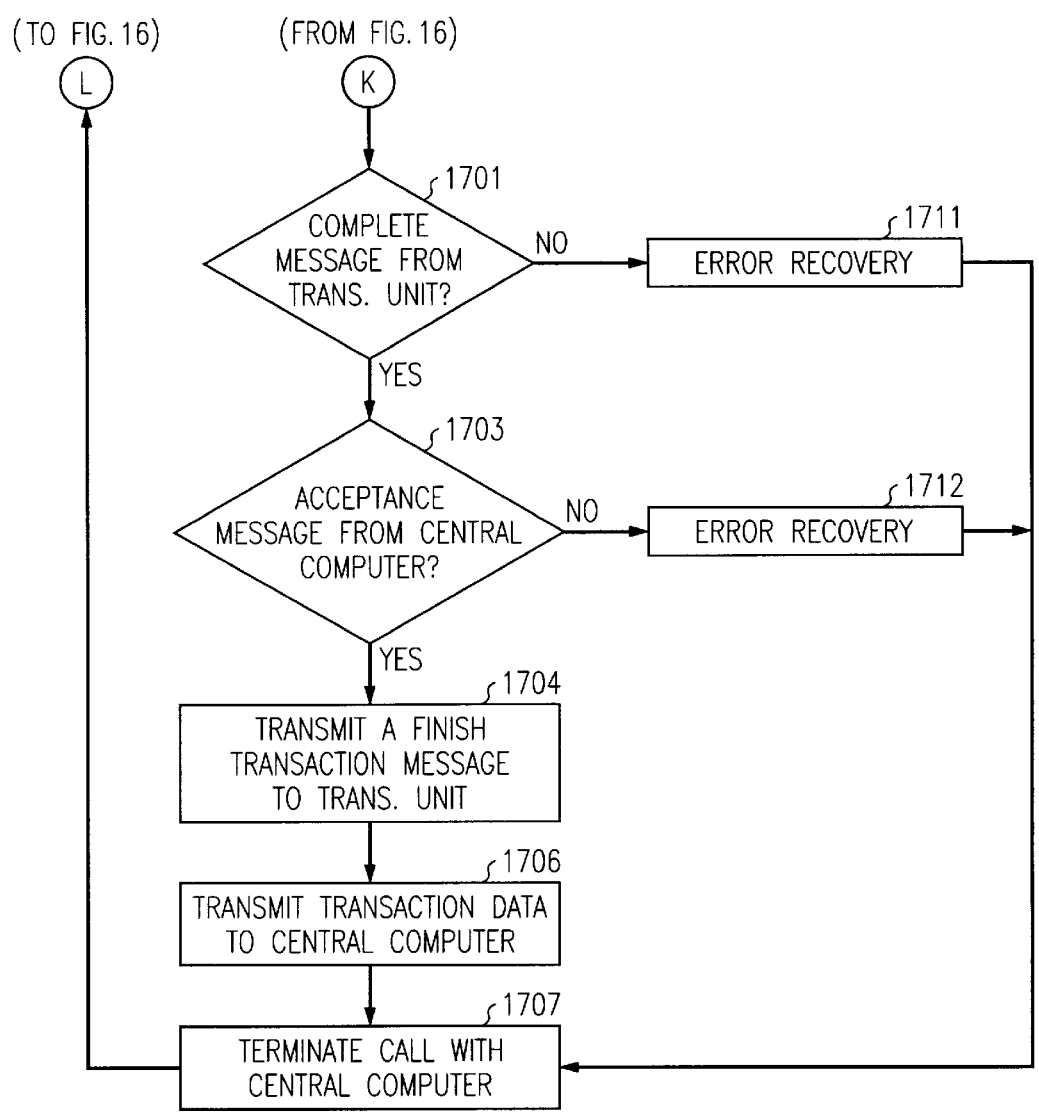
Figure 18:
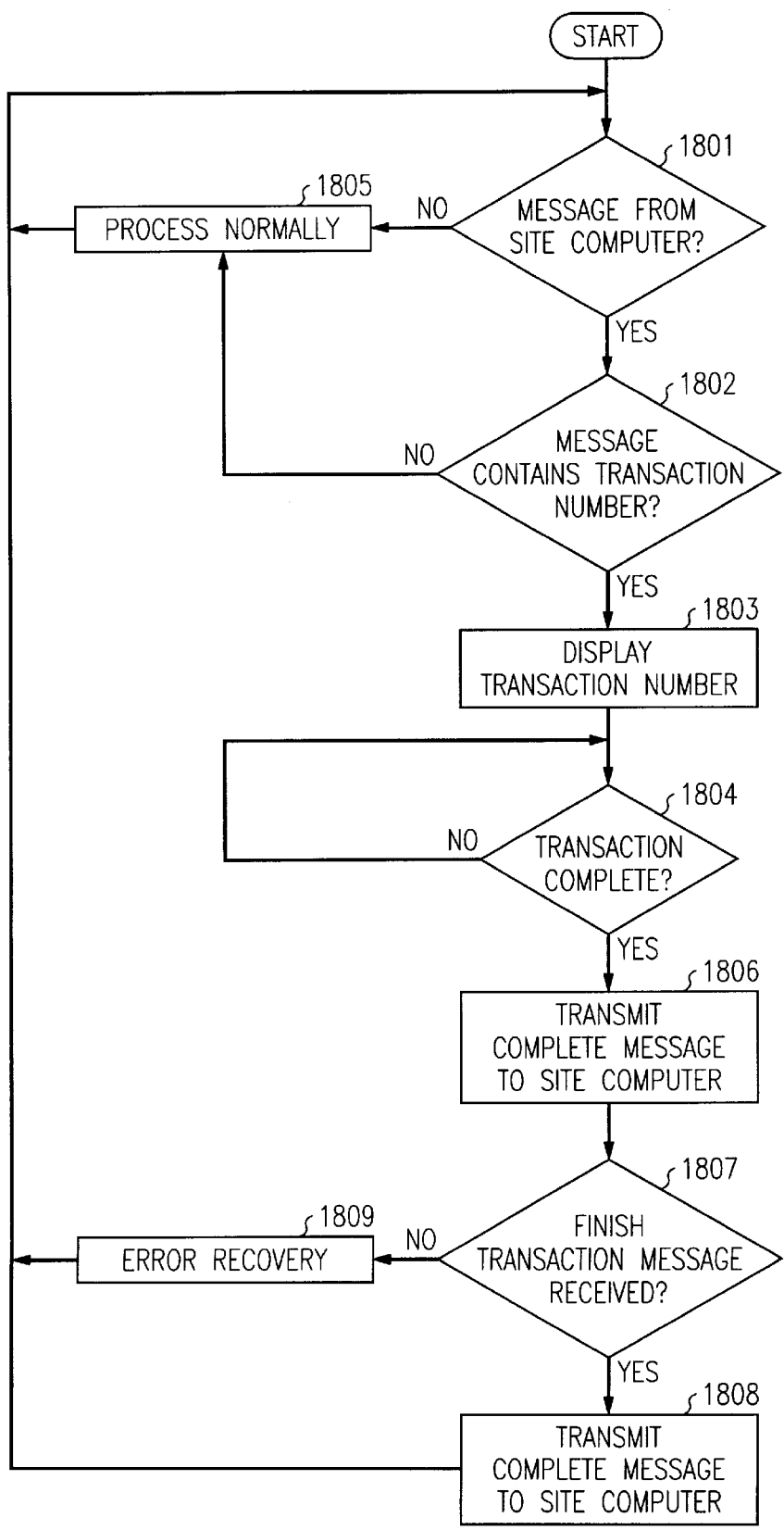
FIG. 18 illustrates, in flowchart form, steps performed by a transaction unit in implementing the second embodiment of the invention.

FIGS. 12–18 illustrate the steps performed in implementing the second embodiment of the invention. In particular, FIGS. 12 and 13 illustrate the steps performed by telephone 303 of FIGS. 3 and 4. After operation is started, decision block 1201 determines if the user of the wireless telephone is requesting an account transaction. If the answer is no, block 1215 performs normal processing before returning control back to decision block 1201. If the answer in decision block 1201 is yes, block 1203 determines the account that the user wishes to use for this particular transaction. Then, block 1204 places a call to central computer 300 identifying the site and the transaction unit. The PIN is transmitted to central computer 300 by block 1205. Decision block 1206 determines if the PIN is accepted by central computer 300. If the answer is no, block 1214 performs error recovery before transferring control back to decision block 1201. If the answer is yes in decision block 1206, block 1207 transmits the account information to central computer 300 before transferring control to block 1301 of FIG. 13.

Block 1301 receives the transaction number from the central computer, and decision block 1302 waits for a match of the transaction number from central computer 300 and the transaction number being transmitted by the transaction unit. If no match occurs after a predefined amount of time, control is transferred to block 1307 which performs error recovery before transferring control back to decision block 1201 of FIG. 12. If the answer is yes in decision block 1302, block 1303 transmits an acceptance message to central computer 300. Decision block 1304 then waits for transaction data from central computer 300. If no transaction data is received, error recovery is performed by block 1308 before transferring control to decision block 1201 of FIG. 12. If the answer is yes in decision block 1304, control is transferred to 1306 which updates the account database as was previously described in the description of the first embodiment.

What is claimed is:

1. A method for conducting transactions by a wireless telephone under control of a central computer with a plurality of transaction units connected to a site computer, comprising the steps of: establishing a first telecommunication call to the central computer by the wireless telephone upon the wireless telephone preparing to engage in a transaction with one of the plurality of the transaction units; establishing a second telecommunication call to the site computer by the central computer in response to the first telecommunication call; transmitting a transaction number to the wireless telephone via the central computer and to the one of transaction units by site computer in response to the second telecommunication call; displaying the received transaction number by the one of the transaction units; displaying the received transaction number to the user of wireless telephone by the wireless telephone; transmitting an acceptance message to central computer by wireless telephone in response to an action by the user of the wireless telephone confirming that the received transaction number displayed bv the one of the transaction units is identical to the received transaction number displayed by the wireless telephone; and retransmitting the acceptance message to the site computer by central computer.

2. The method of claim 1 further comprises the step of verifying personal identification information of a user of the wireless telephone by the central computer before the step of establishing the second telecommunication call is performed.

3. The method of claim 2 further comprises the steps of transmitting account information to the central computer by the wireless telephone;

verifying the account information by the central computer; and transmitting the verified account information to the site computer.

4. The method of claim 1 further comprises the step of transmitting transaction data to the central computer in response to the acceptance message from the central computer by the site computer where the transaction data specifies information about the transaction.

5. The method of claim 4 further comprises the step of retransmitting the transaction data to the wireless telephone by central computer.

6. The method of claim 5 wherein a remote personal computer is used by the user and the method further comprises the step of retransmitting the transaction data to the personal computer by the wireless telephone.

7. The method of claim 1 wherein a remote personal computer is used by the user and the method further comprises the step of retransmitting the transaction data to the personal computer by the central computer in response to receipt of the transaction data from the site computer.

8. A method for allowing transactions by a central computer to be conducted via a wireless telephone with a plurality of transaction units connected to a site computer, comprising the steps of:

receiving a first telecommunication call from the wireless telephone by the central computer upon the wireless telephone preparing to engage in a transaction with one of the plurality of the transaction units;

establishing a second telecommunication call to the site computer by the central computer;

receiving a transaction number from the site computer;

retransmitting the transaction number to the wireless telephone for use by the wireless telephone to confirm the transaction; and receiving account information from the wireless telephone;

verifying the account information by the central computer;

transmitting the verified account information to the site computer;

transmitting a complete message to the site computer by the central computer upon receiving a message from the wireless telephone that the transaction number received by the wireless telephone is identical to that received by the one of transaction units from the site computer.

9. The method of claim 8 further comprises the steps of receiving transaction data from the site computer by central computer where the transaction data specifies information about the transaction; and transmitting the received transaction data to the wireless telephone.

10. The method of claim 8 wherein a remote personal computer is used by the user and the method further comprises the step of transmitting the transaction data to the personal computer by the central computer.

11. An apparatus for performing the method of claim 1.
12. An apparatus for performing the method of claim 2.
13. An apparatus for performing the method of claim 2.
14. An apparatus for performing the method of claim 2.
15. An apparatus for performing the method of claim 6.
16. An apparatus for performing the method of claim 7.
17. An apparatus for performing the method of claim 8.
18. An apparatus for performing the method of claim 15.
19. An apparatus for performing the method of claim 16.
20. An apparatus for performing the method of claim 17.

* * * * *